(12) United States Patent
Park et al.

(10) Patent No.: US 10,082,621 B2
(45) Date of Patent: Sep. 25, 2018

(54) DISPLAY APPARATUS

(71) Applicant: Samsung Display Co., Ltd., Yongin-Si, Gyeonggi-Do (KR)

(72) Inventors: Chan-jae Park, Osan-si (KR); Junwoo You, Seongnam-si (KR); Taeho Lee, Hwaseong-si (KR); Byoungdae Ye, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 15 days.

(21) Appl. No.: 15/228,356

(22) Filed: Aug. 4, 2016

(65) Prior Publication Data
US 2017/0184783 A1    Jun. 29, 2017

(30) Foreign Application Priority Data

Dec. 29, 2015 (KR) .................... 10-2015-0188807

(51) Int. Cl.
*G02F 1/1368* (2006.01)
*F21V 8/00* (2006.01)
*G02F 1/1362* (2006.01)

(52) U.S. Cl.
CPC ........... *G02B 6/0091* (2013.01); *G02B 6/002* (2013.01); *G02B 6/0031* (2013.01); *G02F 1/1362* (2013.01)

(58) Field of Classification Search
CPC .................... G02B 6/0031; G02B 6/0091
See application file for complete search history.

(56) References Cited

U.S. PATENT DOCUMENTS

| | | | | |
|---|---|---|---|---|
| 5,788,356 A * | 8/1998 | Watai | ............... | G02B 6/0031 362/23.15 |
| 6,435,685 B2 * | 8/2002 | Matsushita | ......... | G02B 6/0031 362/23.15 |
| 7,118,266 B2 * | 10/2006 | Matsushita | ......... | G02B 6/0031 362/609 |
| 2003/0189821 A1 * | 10/2003 | Moon | ................ | G02B 6/0021 362/609 |

(Continued)

FOREIGN PATENT DOCUMENTS

| | | |
|---|---|---|
| JP | 2008078145 A | 4/2008 |
| KR | 1020110057710 A | 6/2011 |

(Continued)

*Primary Examiner* — Anh Mai
*Assistant Examiner* — Zachary J Snyder
(74) *Attorney, Agent, or Firm* — Cantor Colburn LLP

(57) ABSTRACT

A display apparatus includes a display panel displaying an image by using light, light source units arranged in a first direction to generate the light, a light guide plate which guides the light to the display panel, a first fixing member fixing a predetermined area of an upper portion of each of the plurality of light source units to a first area of one side surface of the light guide plate adjacent to a top surface of the light guide plate in a second direction crossing the first direction, and a second fixing member fixing a predetermined area of a lower portion of each of the plurality of light source units to a second area of the one side surface of the light guide plate adjacent to a bottom surface of the light guide plate in the second direction where each of the first and second fixing members includes a light reflection material.

19 Claims, 10 Drawing Sheets

(56) References Cited

U.S. PATENT DOCUMENTS

| | | | | |
|---|---|---|---|---|
| 2011/0069510 A1* | 3/2011 | Yamashita | ............ | G02B 6/0085 |
| | | | | 362/612 |
| 2011/0075444 A1* | 3/2011 | Hamada | ............... | G02B 6/0068 |
| | | | | 362/612 |
| 2011/0267841 A1* | 11/2011 | Lee | ........................ | G02B 6/003 |
| | | | | 362/613 |
| 2012/0300495 A1* | 11/2012 | Kim | ..................... | G02B 6/0058 |
| | | | | 362/606 |
| 2013/0128617 A1* | 5/2013 | Lee | .......................... | F21S 8/00 |
| | | | | 362/611 |
| 2013/0163286 A1* | 6/2013 | Lai | ....................... | G02B 6/0091 |
| | | | | 362/613 |
| 2015/0009686 A1* | 1/2015 | Pumyea | ................. | G02B 6/003 |
| | | | | 362/341 |
| 2015/0214445 A1* | 7/2015 | Qiu | ........................ | H01L 27/15 |
| | | | | 257/88 |

FOREIGN PATENT DOCUMENTS

| | | | |
|---|---|---|---|
| KR | 1020110111087 A | 10/2011 | |
| KR | 1020150041324 A | 4/2015 | |
| KR | 101546741 B1 | 8/2015 | |

\* cited by examiner

DISPLAY APPARATUS

This application claims priority to Korean Patent Application No. 10-2015-0188807, filed on Dec. 29, 2015, and all the benefits accruing therefrom under 35 U.S.C. § 119, the content of which in its entirety is herein incorporated by reference.

BACKGROUND

1. Field

Exemplary embodiments of the invention herein relate to a display apparatus, and more particularly, to a display apparatus which fixes a light source to a light guide plate to improve light efficiency.

2. Description of the Related Art

In general, a display apparatus includes a display panel for displaying an image and a backlight unit for providing light to the display panel. The display panel includes a first substrate on which a plurality of pixels is disposed, a second substrate facing the first substrate, and an image display layer disposed between the first and second substrates.

The image display layer is driven by the pixels, and an optical transmittance received from the backlight unit is adjusted by the image display layer to display the image. The image display layer may be a liquid crystal layer, an electrowetting layer, or electrophoresis layer, for example.

The backlight unit may be classified into an edge type backlight unit disposed on a side surface of the display apparatus to generate light and a direct type backlight unit disposed under the display panel to generate light. The edge type backlight unit includes a light source for generating light and a light guide plate for guiding the light received from the light source upward. The light source is spaced apart from the light guide plate by a predetermined distance.

SUMMARY

A portion of a light generated from a light source may not be provided to a light guide plate due to a gap between the light source and the light guide plate. Thus, a light incident efficiency may be deteriorated.

The invention provides a display apparatus that fixes a light source to a light guide plate to improve light efficiency.

Exemplary embodiments of the invention provide display apparatuses including a display panel which displays an image using light, a plurality of light source units arranged in a first direction to generate the light, a light guide plate which receives the light to guide the light to the display panel, a first fixing member which fixes a predetermined area of an upper portion of each of the light source units to a first area of one side surface of the light guide plate, which is adjacent to a top surface of the light guide plate in a second direction crossing the first direction, and a second fixing member which fixes a predetermined area of a lower portion of each of the light source units to a second area of the one side surface of the light guide plate, which is adjacent to a bottom surface of the light guide plate in the second direction, where each of the first and second fixing members includes a light reflection material.

In an exemplary embodiment, a predetermined area of a front surface of each of the light source units, which faces the one side surface of the light guide plate, may contact one side surface of the light guide plate between the first area and the second area.

In an exemplary embodiment, the one side surface of the light guide plate may include a first side surface that is parallel to a third direction perpendicular to a plane parallel to the first and second directions and is parallel to the first direction, a second side surface connected to an upper end of the first side surface, the second side surface including an inclined surface extending at a first acute angle with respect to the second direction in a plane defined by an upward direction of the third direction and a right direction of the second direction, and a third side surface connected to a lower end of the first side surface, the third side surface including an inclined surface extending at a second acute angle with respect to the second direction in a plane defined by a downward direction of the third direction and the right direction of the second direction, where the first fixing member may be connected to the predetermined area of the upper portion of each of the light source unit and the second side surface, the second fixing member may be connected to the predetermined area of the lower portion of each of the light source units and the third side surface, and the right direction of the second direction may be directed from the first side surface to an opposite side surface of the light guide plate, which is a surface opposite to the first side surface.

In an exemplary embodiment, the first acute angle and the second acute angle may be the same with each other.

In an exemplary embodiment, the first fixing member may include a first fixing part which extends in the first direction, and a second fixing part which extends in the first direction, the second fixing part connected to a predetermined area of a bottom surface of the first fixing part, which is adjacent to one side surface of the first fixing part in the second direction, where the one side surface of the first fixing part may include a first inclined surface extending at the first acute angle with respect to the second direction in a plane defined by the downward direction of the third direction and a left direction of the second direction, and the second fixing part may have a right-angled triangular shape when viewed in the first direction, a second inclined surface defined as an oblique side of the second fixing part may extend at the first acute angle and be disposed on the same plane as the first inclined surface, and a first side of the first side and a second side of the second fixing part, which are connected to define a right angle, may be disposed on a predetermined area of the bottom surface of the first fixing part, which is adjacent to the first inclined surface.

In an exemplary embodiment, the second fixing member may include a third fixing part which extends in the first direction, and a fourth fixing part which extends in the first direction, the fourth fixing part connected to a predetermined area of a top surface of the second fixing part, which is adjacent to one side surface of the second fixing part in the second direction, where the one side surface of the third fixing part may include a third inclined surface extending at the second acute angle with respect to the second direction in a plane defined in the upward direction of the third direction and the left direction of the second direction, and the fourth fixing part may have a right-angled triangular shape when viewed in the first direction, a fourth inclined surface defined as an oblique side of the fourth fixing part may extend at the second acute angle and be disposed on the same plane as the third inclined surface, and a third side of the third side and a fourth side of the fourth fixing part, which are connected to define the right angle, may be disposed on a predetermined area of the top surface of the third fixing part, which is adjacent to the third inclined surface.

In an exemplary embodiment, each of the first and third fixing parts may include a light reflection material, and each of the second and fourth fixing parts may include a light transmitting material.

In an exemplary embodiment, each of the second and fourth fixing parts may have the same refractive index as that of the light guide plate.

In an exemplary embodiment, the first and third inclined surfaces may be disposed on the second side surface, and the third and fourth inclined surfaces may be disposed on a lower portion of the third side surface.

In an exemplary embodiment, the display apparatuses may further include an adhesion member which connects the first inclined surface to the second side surface and the third inclined surface to the third side surface.

In an exemplary embodiment, the light source unit may include a bottom part facing the first side surface, the bottom part parallel to the first and third directions, a first sidewall part connected to an upper end of the bottom part to extend in the second direction toward the one side surface of the light guide plate, a second sidewall part connected to a lower end of the bottom part to extend in the second direction toward the one side surface of the light guide plate, the second sidewall part facing the first sidewall part, a light emitting diode disposed on the bottom part to face the first side surface, and a molding part disposed on the bottom part to cover the light emitting diode, the molding part disposed between the first and second sidewall parts.

In an exemplary embodiment, a front surface of the first sidewall part toward the one side surface of the light guide plate may contact a predetermined area of the second side of the second fixing part, which is adjacent to the bottom surface of the first fixing part, and a front surface of the second sidewall part toward the one side surface of the light guide plate may contact a predetermined area of the fourth side of the fourth fixing part, which is adjacent to the top surface of the third fixing part.

In an exemplary embodiment, the bottom surface of the first fixing part, on which the first side of the second fixing part is not disposed, may be disposed on a predetermined area of an outer surface of the first sidewall part, which is adjacent to the front surface of the first sidewall part, the top surface of the third fixing part, on which the third side of the fourth fixing part is not disposed, may be disposed on a lower portion of a predetermined area of an outer surface of the second sidewall part, which is adjacent to the front surface of the second sidewall part, and the outer surface of the first sidewall part may be a surface opposite to an inner surface of the first sidewall part on which the molding part is disposed, and the outer surface of the second sidewall part may be a surface opposite to an inner surface of the second sidewall part on which the molding part is disposed.

In an exemplary embodiment, the display apparatuses may further include an adhesion member which connects the bottom surface of the first fixing part, on which the first side of the second fixing part is not disposed, to a predetermined area of the outer surface of the first sidewall part, which is adjacent to the front surface of the first sidewall part, and which connects the top surface of the third fixing part, on which the third side of the fourth fixing part is not disposed, to a predetermined area of the outer surface of the second sidewall part, which is adjacent to the front surface of the second sidewall part.

In an exemplary embodiment, a front surface of the molding part toward the one side surface of the light guide plate may contact the first side surface, a predetermined area of the second side of the second fixing part, which is adjacent to the upper end of the first side surface, and a predetermined area of the fourth side of the fourth fixing part, which is adjacent to the lower end of the first side surface.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
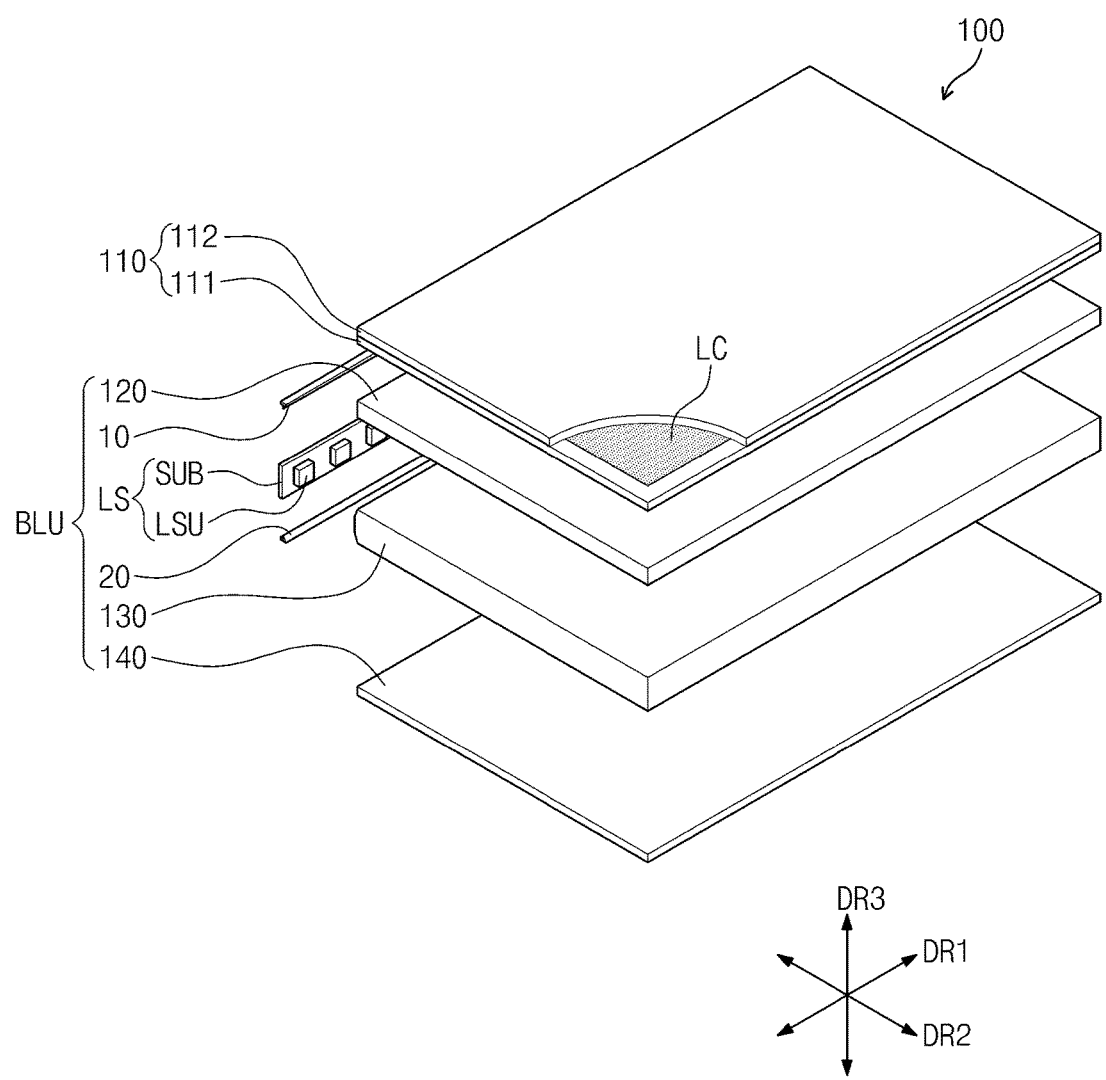
FIG. 1 is an exploded perspective view of an exemplary embodiment of a display apparatus according to the invention.

Advantages and features of the invention, and implementation methods thereof will be clarified through following embodiments described with reference to the accompanying drawings. The invention may, however, be embodied in different forms and should not be construed as limited to the embodiments set forth herein. Rather, these embodiments are provided so that this invention will be thorough and complete, and will fully convey the scope of the invention to those skilled in the art. Further, the invention is only defined by scopes of claims. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element or layer, there are no intervening elements or layers present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the invention. Like reference numerals refer to like elements throughout.

It will be understood that although the terms of first and second are used herein to describe various elements, these elements should not be limited by these terms. These terms are only used to distinguish one component from another component. Accordingly, a first element, a first component, or a first section that will be described below may be a second element, a second component, or a second section within the technical idea of the invention.

The embodiment in the detailed description will be described with schematic cross-sectional views and/or plan views as ideal exemplary views of the invention. Accordingly, shapes of the exemplary views may be modified according to manufacturing techniques and/or allowable errors. Therefore, the embodiments of the invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the DRAWINGS are schematic in nature and their shapes are not intended to illustrate the precise shape of a region and are not intended to limit the scope of the claims.

Hereinafter, exemplary embodiments of the invention will be described below in more detail with reference to the accompanying drawings.

Figure 2:
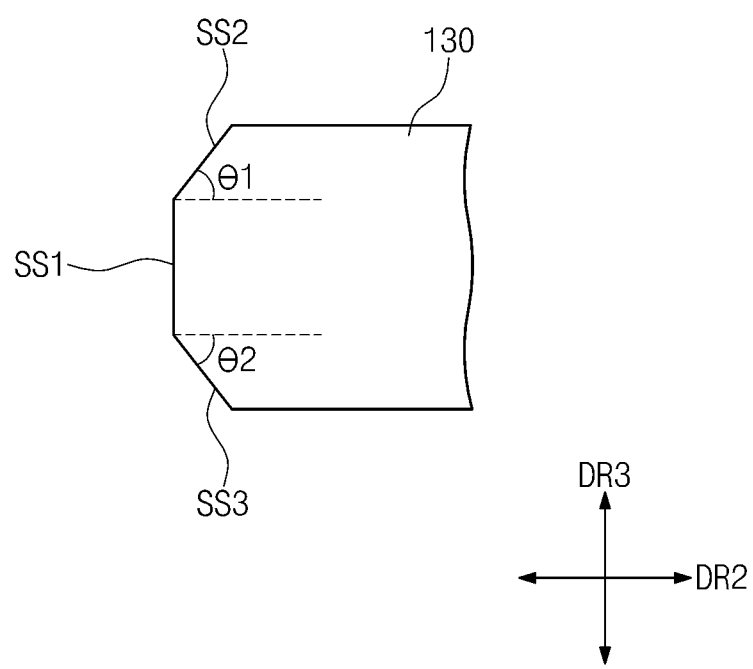
FIG. 2 is a view illustrating a side surface of a predetermined portion on a side of a light guide plate of FIG. 1.
Figure 3:
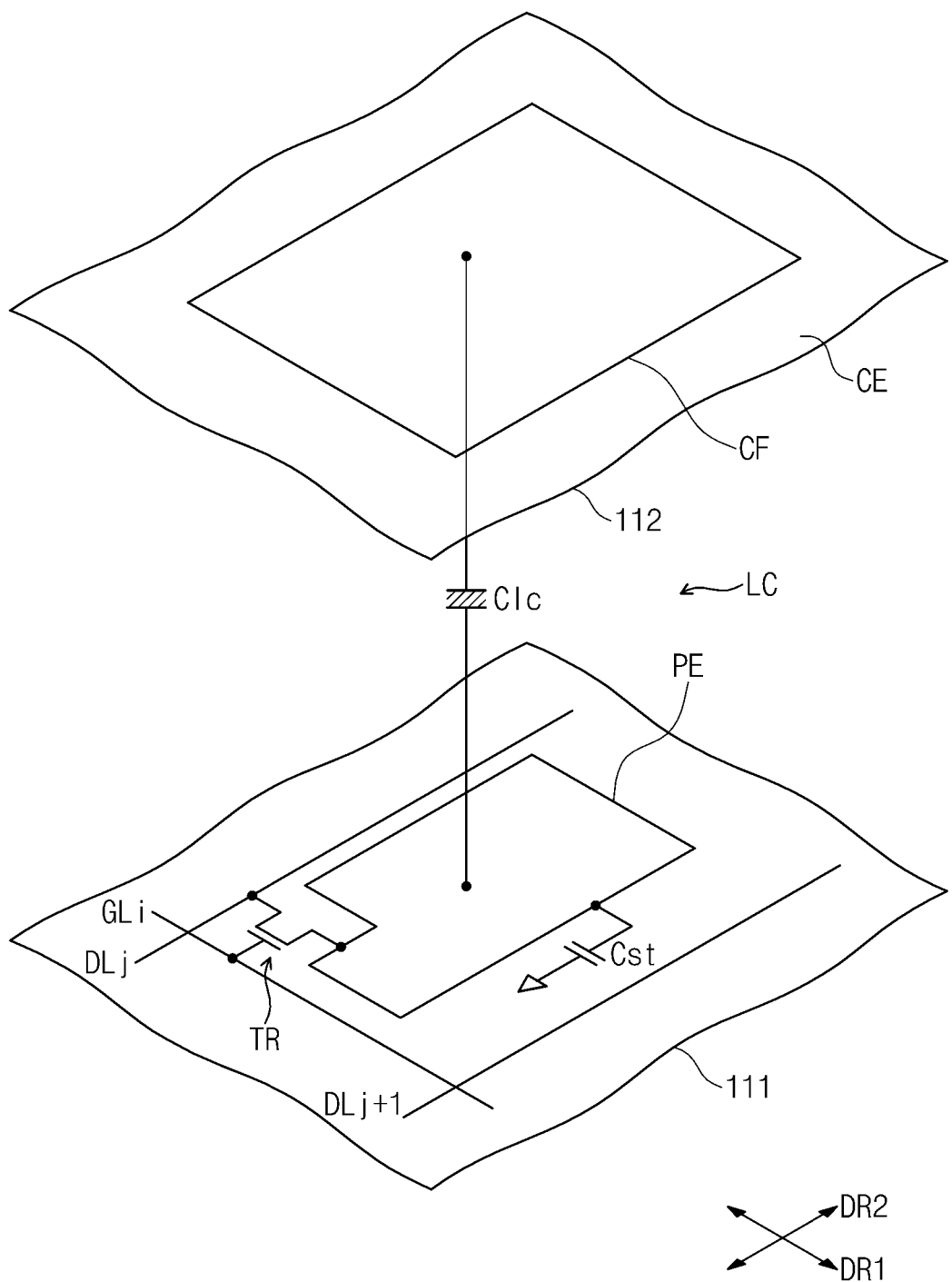
FIG. 3 is an equivalent circuit view of one pixel of pixels disposed on a display panel of FIG. 1.

FIG. 1 is an exploded perspective view of a display apparatus according to an exemplary embodiment of the invention. FIG. 2 is a view illustrating a side surface of a predetermined portion on a side of a light guide plate of FIG. 1. FIG. 3 is an equivalent circuit view of one pixel of pixels disposed on a display panel of FIG. 1.

Referring to FIGS. 1 and 2, a display apparatus 100 according to an exemplary embodiment of the invention includes a display panel 110 for displaying an image using light and a backlight unit BLU generating light to provide the generated light to the display panel 110.

In an exemplary embodiment, the display panel 110 has a long side in a first direction DR1 and a short side in a second direction DR2 crossing the first direction DR1. In an exemplary embodiment, the backlight unit BLU may be disposed at a rear side of the display panel 110 to provide the light to the display panel 110.

Although not shown in FIG. 1, the display panel 110 includes a plurality of pixels for displaying an image using light. Each of the pixels may display one of primary colors. In an exemplary embodiment, the primary colors may include red, green, and blue colors, for example. However, the invention is not limited thereto. In an exemplary embodiment, the primary colors may further include various other colors such as a white color, a yellow color, cyan, and magenta.

In an exemplary embodiment, the display panel 110 may be a liquid crystal display panel including a liquid crystal layer, for example. In an exemplary embodiment, the display panel 110 may include a first substrate 111 on which the plurality of pixels are disposed, a second substrate 112 facing the first substrate 111, and a liquid crystal layer LC disposed between the first substrate 111 and the second substrate 112, for example. However, the invention is not limited thereto. In an exemplary embodiment, the display panel 110 may be an electrophoretic display panel including an electrophoretic layer or an electrowetting display panel including an electrowetting layer, for example.

In an exemplary embodiment, the backlight unit BLU may be an edge type backlight unit. The backlight unit BLU includes an optical sheet 120, a light guide plate 130, a light source LS, fixing member 10 and 20, and a reflection sheet 140. Each of the optical sheet 120, the light guide plate 130, and the reflection sheet 140 has a long side in the first direction DR1 and a short side in a second direction DR2. The light source LS and the fixing members 10 and 20 extend in the first direction DR1.

Hereinafter, a third direction DR3 may be defined as a direction perpendicular to a plane parallel to the first and second directions DR1 and DR2. Also, each of the first, second, and third directions DR1, DR2, and DR3 may be bidirectionally defined.

The optical sheet 120 is disposed on an upper portion of the light guide plate 130, and the reflection sheet 140 is disposed on a lower portion of the light guide plate 130. The display panel 110 is disposed on an upper portion of the optical sheet 120. The light source LS is disposed adjacent to one side of the light guide plate 130 in the second direction DR2. The light source LS may be connected to one side of the light guide plate 130 by the fixing members 10 and 20.

Surfaces SS1, SS2, and SS3 of the light guide plate 130 include a first side surface SS1 parallel to a plane defined by the first and third directions DR1 and DR3, a second side surface SS2 connected to an upper end of the first side surface SS1 and having an inclined surface, and a third side surfaces SS3 connected to a lower end of the first side surface SS1 and having an inclined surface. The second side surface SS2 and the third side surface SS3 may have shapes that are symmetrical to each other and defined as chamfers.

The second side surface SS2 of the light guide plate 130 may be defined as a first area that is adjacent to a top surface of the light guide plate 130, and the third side surface SS3 of the light guide plate 130 may be defined as a second area that is adjacent to a bottom surface of the light guide plate 130.

The top surface of the light guide plate 139 may be disposed at a height greater than that of an upper end of the first side surface SS1, and the bottom surface of the light guide plate 130 may be disposed at a height less than that of the first side surface SS1. Each of the top and bottom surfaces of the light guide plate 130 in the second direction DR2 has a length less than a distance between the first side surface SS1 of the light guide plate 130 and an opposite side surface of the light guide plate 130, which is opposite to the first side surface SS1.

The second side surface SS2 may be defined as an inclined surface having a first acute angle $\theta1$ with respect to the second direction DR2 in a plane defined by an upward direction of the third direction DR3 and a right direction of the second direction DR2. The right direction of the second direction DR2 may be defined as a direction that is directed from the first side surface SS1 of the light guide plate 130 toward the opposite side surface of the light guide plate 130. The second side surface SS2 extends at the first acute angle $\theta1$ with respect to the second direction DR2 to connect the upper end of the first side surface SS1 to one side of the top surface of the light guide plate 130.

The third side surface SS3 may be defined as an inclined surface having a second acute angle $\theta2$ with respect to the second direction DR2 in a plane defined by a downward direction of the third direction DR3 and the right direction of the second direction DR2. The third side surface SS3 extends at the second acute angle $\theta2$ with respect to the second direction DR2 to connect the lower end of the first side surface SS1 to one side of the bottom surface of the light guide plate 130.

Each of the first and second acute angles $\theta1$ and $\theta2$ may be defined as an angle less than the right angle. In an exemplary embodiment, the first acute angle $\theta1$ may be defined as the same angle as that of the second acute angle $\theta2$, for example. However, the invention is not limited thereto, and thus, the first acute angle $\theta1$ may be different from the second acute angle $\theta2$.

The opposite side surface of the light guide plate 130 connects the other side of the top surface of the light guide plate 130 to the other side of the bottom surface of the light guide plate in the second direction DR2. The first side surface SS1 of the light guide plate 130 may be defined as a light incident part, and the opposite side surface of the light guide plate may be defined as a light emission part. The light guide plate 130 may include glass. However, the invention is not limited thereto. In an exemplary embodiment, the light guide plate 130 may include a plastic material such as polymethyl methacrylate ("PMMA").

The light source LS includes a light source substrate SUB extending in the first direction DR1 and a plurality of light source units LSU disposed (e.g., mounted) on the light source substrate SUB. The light source units LSU is disposed on an entire surface of the light source substrate SUB facing the first side surface SS1 of the light guide plate 130 in the second direction DR2. The light source units LSU may be disposed at a predetermined interval in the first direction DR1. In an exemplary embodiment, the light source units LSU may be disposed at the same distance from each other, for example. The light source units LSU face the first side surface SS1 of the light guide plate 130.

The fixing members 10 and 20 include a first fixing member 10 disposed on an upper portion of the light source LS and a second fixing member 20 disposed on a lower portion of the light source LS. The first fixing member 10 includes a light reflection material. The first fixing member 10 fixes a predetermined area of an upper portion of each of the light source units LSU to the second side surface SS2 that is the first area of the side surfaces SS1, SS2, and SS3. The second fixing member 20 includes a light reflection material. The second fixing member 20 fixes a predetermined area of a lower portion of each of the light source units LSU to the second side surface SS2 that is the second area of the side surfaces SS1, SS2, and SS3. Hereinafter, the above-described constitutions will be described in detail with reference to FIG. 6.

The light source units LSU of the light source LS generate light to be used in the display panel 110. The light generated in the light source units LSU is provided to the light incident part of the light guide plate 130 in the second direction DR2. The light guide plate 130 guides the light to the display panel 110. In an exemplary embodiment, the light guide plate 130 may change a traveling direction of the light provided from the light source units LSU so that the light travels in the upward direction in which the display panel 110 is disposed, for example.

The reflection sheet 140 reflects the light emitted to a lower side of the light guide plate 130 so that the light is emitted upward. The optical sheet 120 includes a diffusion sheet (not shown) and a prism sheet (not shown) disposed on the diffusion sheet. The diffusion sheet may diffuse the light provided from the light guide plate 130.

The prism sheet may collect the light diffused by the diffusion sheet in the upward direction that is perpendicular to the plane. The light passing through the prism sheet may travels upward and be provided to the display panel 110 with uniform luminance distribution. The display panel 110 may display an image using the light provided thereto.

Referring to FIG. 3, the display panel 110 includes the first substrate 111, the second substrate 112 facing the first substrate 111, and the light crystal layer LC disposed between the first substrate 111 and the second substrate 112.

The pixel includes a transfer TR connected to a gate line GLi and a data line DLj, a liquid crystal capacitor Clc connected to the transistor TR, and a storage capacitor Cst parallelly connected to the liquid crystal capacitor Clc, where I and j are natural numbers. In another exemplary embodiment, the storage capacitor Cst may be omitted. In an exemplary embodiment, the gate line GLi extends in the first direction DR1, and the data line DLj extends in the second direction DR2.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC may serve as a dielectric. The pixel electrode PE is connected to the drain electrode of the transistor TR. In an exemplary embodiment, the pixel electrode PE may be disposed between adjacent data lines DLj and DLj+1.

Although the pixel electrode PE has a non-slit structure in FIG. 3, the invention is not limited thereto. In an exemplary embodiment, the pixel electrode PE may have a slit structure including a stem part having a cross shape and a plurality of branch parts radially extending from the stem part, for example.

The common electrode CE may be disposed over an entire surface of the second substrate 112. However, the invention is not limited thereto. In an exemplary embodiment, the common electrode CE may be disposed on the first substrate 111, for example. In this case, at least one of the pixel electrode PE and the common electrode CE may have a slit.

The storage capacitor Cst may include the pixel electrode PE, a storage electrode (not shown) that is branched from a storage line (not shown), and an insulation layer disposed between the pixel electrode PE and the storage electrode. The storage line is disposed on the first substrate 111. Also, the storage line may be simultaneously provided together with the gate line GLi on the same layer. The storage electrode may partially overlap the pixel electrode PE.

The pixel may further include a color filter CF for representing one of red, green, and blue colors. As an exemplary embodiment, the color filter CF may be disposed on the second substrate 112 as illustrated in FIG. 3. However, the invention is not limited thereto. In an exemplary embodiment, the color filter CF may be disposed on the first substrate 111, for example.

The transistor TR is turned on in response to s gate signal provided through the gate line GLi. A data voltage received through the data line DLj is provided to the pixel electrode PE of the liquid crystal capacitor Clc through the transistor TR that is turned on. A common voltage is applied to the common electrode CE.

Electric fields are generated between the pixel electrode PE and the common electrode CE by a difference in voltage level between the data voltage and the common voltage. Liquid crystal molecules of the liquid crystal layer LC operate by the electric fields generated between the pixel electrode PE and the common electrode CE. Light transmittance may be adjusted by the liquid crystal molecules that operate by the electric field to display an image.

A storage voltage having a uniform voltage level may be applied to the storage line. However, the invention is not limited thereto. In an exemplary embodiment, the common voltage may be applied to the storage line, for example. The storage capacitor Cst may supplement a voltage that is charged in the liquid crystal capacitor Clc.

For convenience of description, although one pixel connected to the gate line GLi and the data line DLj is illustrated in FIG. 3, other pixels of the display panel 110 may have the same configuration as that of the pixel of FIG. 3.

Figure 4:
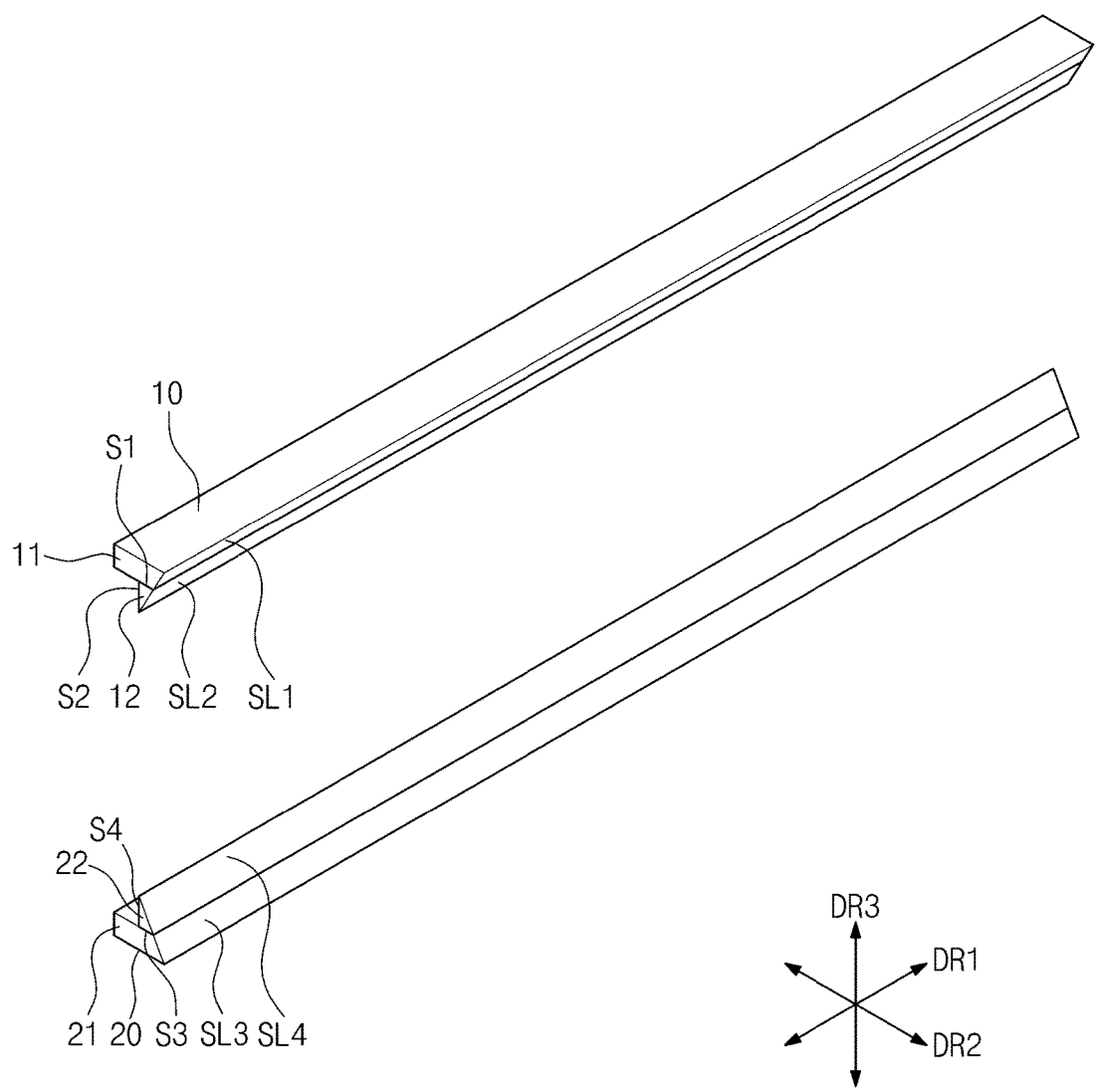
FIG. 4 is an enlarged view of first and second fixing members of FIG. 1.
Figure 5:
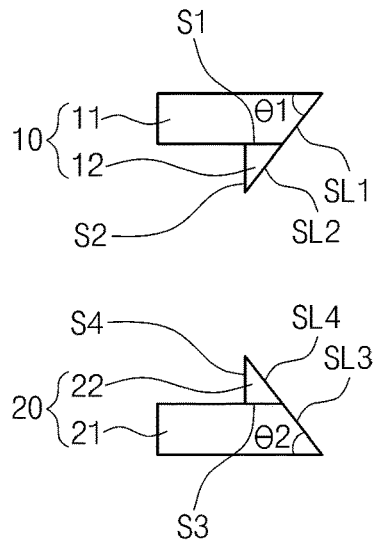
FIG. 5 is a side view of the first and second fixing members when the first and second fixing members of FIG. 4 are viewed in a first direction.

FIG. 4 is an enlarged view of the first and second fixing members of FIG. 1. FIG. 5 is a side view of the first and second fixing members when the first and second fixing members of FIG. 4 are viewed in a first direction.

Referring to FIGS. 4 and 5, each of the first and second fixing members 10 and 20 extends in the first direction DR1. The first and second fixing members 10 and 20 face each other in the third direction DR3.

The first fixing member 10 includes a fixing part 11 extending in the first direction DR1 and a second fixing part 12 extending in the first direction DR1 and connected to a predetermined area of a bottom surface of the first fixing part 11 that is adjacent to one side surface of the first fixing part 11 in the second direction DR2. The first fixing part 11 has a long side in the first direction DR1 and a short side in the second direction DR2.

A top surface of the first fixing part 11 has a length in the second direction DR2 greater than that of the bottom surface of the first fixing part 11. One side surface of the first fixing part 11 may be defined as a first inclined surface SL1 having a predetermined inclination. The opposite side surface of the first fixing part 11, which is a surface opposite to the one side surface of the first fixing part 11, may be a surface parallel to a plane defined by the first direction DR1 and the third direction DR3.

The first inclined surface SL1 of the first fixing part 11 extends at the first acute angle θ1 with respect to the second direction DR2 in the plane defined by the downward direction of the third direction DR3 and a left direction of the second direction DR2. The left direction of the second direction DR2 may be defined as a direction that is opposite to the right direction of the second direction DR2. The first inclined surface SL1 connects one side of the top surface of the first fixing part 11 to one side of the bottom surface of the first fixing part 11.

The second fixing part 12 is connected to a predetermined area of the bottom surface of the first fixing part 11 adjacent to the first inclined surface SL1 of the first fixing part 11 in the second direction DR2. In an exemplary embodiment, the second fixing part 12 has a right-angled triangular shape when viewed in the first direction DR1, for example. Here, the side facing the right angle in the right-angled triangular shape may be defined as an oblique side. The oblique side of the second fixing part 12, which faces the right angle in the second fixing part 12, may be defined as a second inclined surface SL2.

The second inclined surface SL2 of the second fixing part 12 extends at the first acute angle θ1 with respect to the second direction DR2 in the plane defined by the downward direction of the third direction DR3 and the left direction of the second direction DR2. Thus, the first inclined surface SL1 of the first fixing part 11 and the second inclined surface SL2 of the second fixing part 12 may be disposed on the same plane. Each of the first inclined surface SL1 and the second inclined surface SL2 may be an inclined surface having the same first acute angle θ1 as that of the second side surface SS2.

A first side S1 of first and second sides S1 and S2 of the second fixing part 12, which are connected to define a right angle, may be disposed on a predetermined area of the bottom surface of the first fixing part 11, which is adjacent to the first inclined surface SL1 of the first fixing part 11. Although not shown, the second fixing part 12 may be connected to the first fixing part 11 using an adhesive.

The first fixing part 11 may reflect light. In an exemplary embodiment, the first fixing part 11 may include a light reflection material such as a white mold or a metal material. The second fixing part 12 may transmit light therethrough.

In an exemplary embodiment, the second fixing part 12 may include a light transmitting material such as silicon, acrylic resin, or polyimide ("PI").

The second fixing member 20 may be disposed under the first fixing member 10, and the first and second fixing members 10 and 20 may face each other. The second fixing member 20 may have the same shape as that of the first fixing member 10 and include the same material as that of the first fixing member 10. Also, the first and second fixing members 10 and 20 may be disposed symmetrical to each other.

In an exemplary embodiment, the second fixing member 20 includes a third fixing part 21 having the same shape as that of the first fixing part 11 and including the same material as that of the first fixing part 11 and a fourth fixing part 22 having the same shape as that of the second fixing part 12 and including the same material as that of the second fixing part 12, for example. Each of the second and fourth fixing parts 12 and 22 may have the same refractive index as that of the light guide plate 130.

The third fixing part 21 may be disposed under the first fixing part 11 to face the first fixing part 11. In an exemplary embodiment, the first and third fixing parts 11 and 21 may be disposed symmetrical to each other. The fourth fixing part 22 may be disposed under the second fixing part 12 to face the second fixing part 12. In an exemplary embodiment, the second and fourth fixing parts 12 and 22 may be disposed symmetrical to each other.

One side surface of the third fixing part 21 may be defined as a third inclined surface SL3 having a predetermined inclination, and an oblique side of the fourth fixing part 22 having a triangular shape may be defined as a fourth inclined surface SL4. A third side S3 of third and fourth sides S3 and S4 of the fourth fixing part 22, which are connected to define a right angle, may be disposed on a predetermined area of a top surface of the third fixing part 21, which is adjacent to the third inclined surface SL3 of the third fixing part 21.

Each of the third inclined surface SL3 and the fourth inclined surface SL4 extends at the second acute angle θ2 with respect to the second direction DR2 in the plane defined by the upward direction of the third direction DR3 and the left direction of the second direction DR2. Thus, the third inclined surface SL3 and the fourth inclined surface SL4 may be disposed on the same plane. Each of the third inclined surface SL3 and the fourth inclined surface SL4 may be an inclined surface having the same second acute angle θ2 as that of the third side surface SS3.

Figure 6:
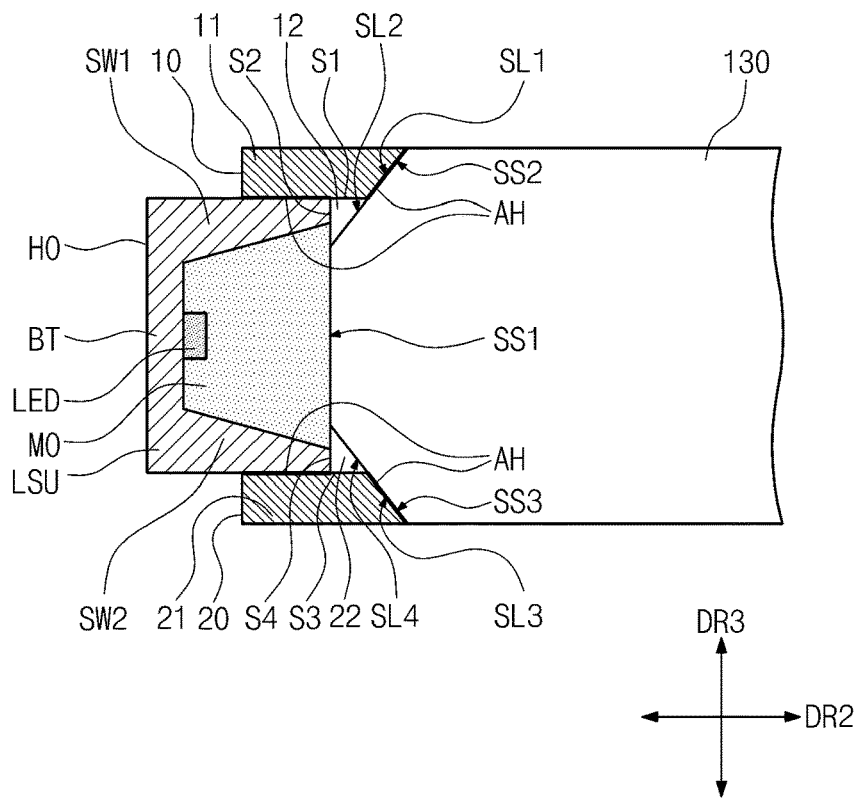
FIG. 6 is a cross-sectional view illustrating a state in which a light source unit of FIG. 1 is connected to the light guide plate through the first and second fixing members.

FIG. 6 is a cross-sectional view illustrating a state in which the light source unit of FIG. 1 is connected to the light guide plate through the first and second fixing members.

For convenience of description, the light source substrate SUB is omitted. Also, one light source unit LSU, the first and second fixing members 10 and 20, one side surface of the light guide plate 130, and a cross-section of a predetermined area of the light guide plate 130, which is adjacent to one side surface of the light guide plate 130, are illustrated in FIG. 6.

Referring to FIG. 6, the light source unit LSU includes a housing HO, a light emitting diode LED accommodated in the housing HO, and a molding part MO disposed on the housing HO to cover the light emitting diode LED.

The housing HO includes a bottom part BT that is parallel to the first and third direction DR1 and DR3, a first sidewall part SW1 connected to an upper end of the bottom part BT to extend in the second direction DR2, and a second sidewall part SW2 connected to a lower end of the bottom part BT to extend in the second direction DR2.

The first sidewall part SW1 and the second sidewall part SW2 face each other. The bottom part BT faces the first side surface SS1 of the light guide plate 130, and the first and second sidewall parts SW1 and SW2 extend to one side surface of the light guide plate 130.

The light emitting diode LED and the molding part MO are accommodated in a space between the bottom part BT and the first and second sidewall parts SW1 and SW2. In an exemplary embodiment, the light emitting diode LED is disposed on the bottom part BT to face the first side surface SS1 of the light guide plate 130, for example. The molding part MO is disposed on the bottom part BT to cover the light emitting diode LED and also be disposed between the first and second sidewall parts SW1 and SW2.

Surfaces of the first and second sidewall parts SW1 and SW2, which face the side surfaces SS1, SS2, and SS3 of the light guide plate 130, and a surface of the molding part MO may be defined as front surfaces of the first and second sidewall parts SW1 and SW2 and a front surface of the molding part MO, respectively. A thickness of the light source unit LSU in the third direction DR3 is less than that of the light guide plate 130. A length of the front surface of the molding part MO in the third direction DR3 is greater than that of the first side surface SS1 of the light guide plate 130.

The first fixing member 10 adheres to or is connected to a predetermined area of an upper portion of the light source unit LSU and the second side surface SS2 of the light guide plate 130. The second fixing member adheres to or is connected to a predetermined area of a lower portion of the light source unit LSU. Thus, the light source unit LSU may be connected to one side of the light guide plate 130.

Particularly, a bottom surface of the first fixing part 11 on which the first side S1 of the second fixing part 12 is not disposed may be disposed on a predetermined area of an outer surface of the first sidewall part SW1, which is adjacent to the front surface of the first sidewall part SW1. The outer surface of the first sidewall part SW1 may be defined as a surface that is opposite to an inner surface of the first sidewall part SW1 on which the molding part MO is disposed.

The bottom surface of the first fixing part 11 on which the first side S1 of the second fixing part 12 is not disposed may adhere to or be connected to a predetermined area of the outer surface of the first sidewall part SW1, which is adjacent to the front surface of the first sidewall part SW1, using an adhesion member AH.

The top surface of the third fixing part 21 on which the third side S3 of the fourth fixing part 22 is not disposed may be disposed on a lower portion of a predetermined area of the outer surface of the second sidewall part SW2, which is adjacent to the front surface of the second sidewall part SW2. The outer surface of the second sidewall part SW1 may be defined as a surface that is opposite to an inner surface of the second sidewall part SW2 on which the molding part MO is disposed.

The top surface of the third fixing part 21 on which the third side S3 of the fourth fixing part 22 is not disposed may adhere to or be connected to a predetermined area of the outer surface of the second sidewall part SW2, which is adjacent to the front surface of the second sidewall part SW2, using the adhesion member AH.

The top surfaces of the first fixing part 11 and the light guide plate 130 may be disposed at the same height. The bottom surfaces of the third fixing part 21 and the light guide plate 130 may be disposed at the same height.

The first inclined surface SL1 of the first fixing part 11 and the second inclined surface SL2 of the second fixing part 12 may be disposed on the second side surface SS2 of the light guide plate 130. The first inclined surface SL1 may adhere to or be connected to the second side surface SS2 using the adhesion member AH.

The third inclined surface SL3 of the third fixing part 21 and the fourth inclined surface SL4 of the fourth fixing part 22 may be disposed on a lower portion of the third side surface SS3 of the light guide plate 130. The third inclined surface SL3 may adhere to or be connected to the third side surface SS3 using the adhesion member AH.

The front surface of the molding part MO and the front surfaces of the first and second sidewall parts SW1 and SW2 may be disposed on the first side surface SS1 of the light guide plate 130, the second side S2 of the second fixing part 12, and the fourth side S4 of the fourth fixing part 22 by the first and second fixing members 10 and 20.

The front surface of the first sidewall part SW1 may contact a predetermined area of the second side S2 of the second fixing part 12, which is adjacent to the bottom surface of the first fixing part 11. The front surface of the second sidewall part SW2 may contact a predetermined area of the fourth side S4 of the fourth fixing part 22, which is adjacent to the top surface of the third fixing part 21.

The front surface of the molding part MO and the front surfaces of the first and second sidewall parts SW1 and SW2 may be defined as a front surface of the light source unit LSU. A predetermined area of the front surface of the light source unit LSU may contact the first side surface SS1 of the light guide plate 130, which is disposed between the second side surface SS2 and the third side surface SS3.

In an exemplary embodiment, the front surface of the molding part MO may contact the first side surface SS1 of the light guide plate 130, a predetermined area of the second side S2 of the second fixing part 12, which is adjacent to the upper end of the first side surface SS1, and a predetermined area of the fourth side S4 of the fourth fixing part 22, which is adjacent to the lower end of the first side surface SS1, for example.

The light source unit LSU may be firmly fixed to one side of the light guide plate 130 by the above-described configurations. Also, the light source unit LSU may contact the first side surface SS1 of the light guide plate 130 to provide a more amount of light to the light guide plate 130. Light emitted between the first sidewall part SW1 and the first side surface SS1 and between the second sidewall part SW2 and the first side surface SS1 may be reflected by the first and second fixing parts 11 and 21, which reflect light, and thus be reduced in light loss. As a result, light incident efficiency may be improved.

Therefore, in the display apparatus 100 according to an exemplary embodiment of the invention, the light source LS may be firmly fixed to the one side of the light guide plate 130 and also contact the one side surface of the light guide plate 130 to improve the light incident efficiency.

FIGS. 7 to 11 are views illustrating components of first and second fixing members of a display apparatus according to another exemplary embodiment of the invention.

The display apparatus according to another exemplary embodiment of the invention may have the same configuration as that of the display apparatus 100 of FIG. 1 except for configurations of first and second fixing members 10_1 and 20_1. Hereinafter, differences between the first and second fixing members 10 and 20 of FIG. 6 and the first and second fixing members 10_1 and 20_1 of FIG. 7 will be mainly described for explaining the first and second fixing members 10_1 and 20_1 of FIG. 7. The same components will be represented by the same reference numerals.

Figure 7:
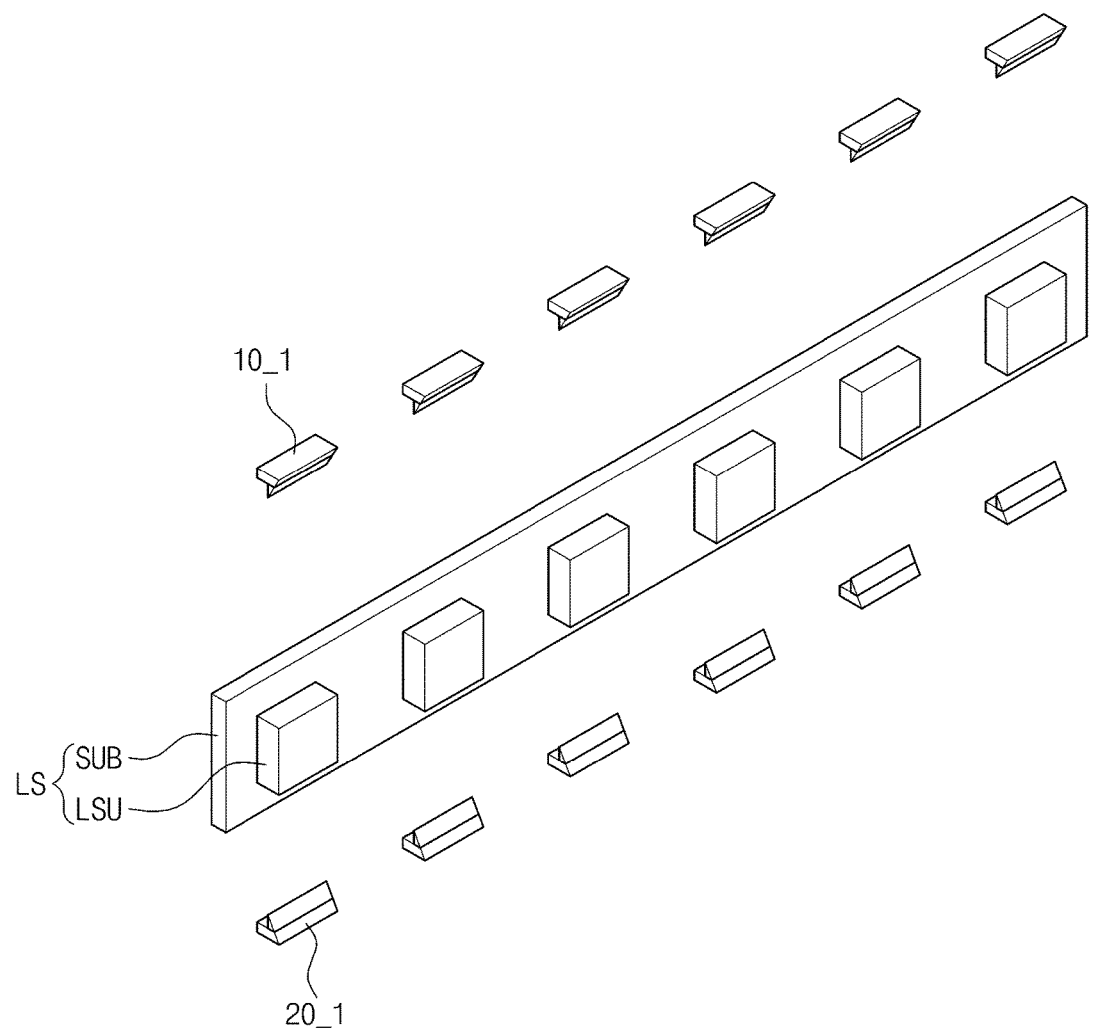
FIGS. 7 to 11 are views illustrating components of first and second fixing members of a display apparatus according to various exemplary embodiments of the invention.

Referring to FIG. 7, the first fixing units 10_1 are disposed on light source units LSU, and the second fixing units 20_1 are disposed under the light source units LSU. The first fixing units 10_1 respectively correspond to the light source units LSU, and the second fixing units 20_1 respectively correspond to the light source units LSU. That is, the first fixing units 10_1 may correspond to the light source units LSU in one-to-one correspondence, and the second fixing units 20_1 may correspond to the light source units LSU in one-to-one correspondence.

The first and second fixing units 10_1 and 20_1 may have the same width as that of the light source units LSU in a first direction DR1 (refer to FIG. 4). Each of the first fixing units 10_1 may be disposed to face the corresponding second fixing units 20_1 in a third direction DR3.

The first and second fixing units 10_1 and 20_1 may have the same cross-section as that of the first and second fixing units 10 and 20 of FIG. 6. Thus, the structure in which the first and second fixing units 10_1 and 20_1 fix the light source units LSU to a light guide plate may be substantially the same as that in which the first and second fixing members 10 and 20 fix the light source units LSU to the light guide plate 130.

Each of the first fixing units 10_1 may fix a predetermined area of an upper portion of the corresponding light source unit LSU of the light source units LSU to a second side surface SS2 of one side surface of the light guide plate. Each of the second fixing units 20_1 may fix a predetermined area of a lower portion of the corresponding light source unit LSU of the light source units LSU to a third side surface SS3 of one side surface of the light guide plate. Thus, the light source LS may be firmly fixed to the light guide plate to improve light incident efficiency.

FIGS. 8 to 11 are views illustrating components of first and second fixing members of a display apparatus according to another exemplary embodiment of the invention.

The display apparatus according to another exemplary embodiment of the invention may have the same configuration as that of the display apparatus 100 of FIG. 1 except for configurations of first and second fixing members 10_2 and 20_2 and a light source unit LSU_1.

Hereinafter, differences between the first and second fixing members 10 and 20 and the light source unit LSU of FIG. 6 and the first and second fixing members 10_2 and 20_2 and the light source unit LSU_1 of FIG. 8 will be mainly described for explaining the first and second fixing members 10_2 and 20_2 and the light source unit LSU_1 of FIG. 8. The same components will be represented by the same reference numerals. For convenience of description, the connection configurations between the first and second fixing members 10_2 and 20_2, one light source unit LSU_1, and the light guide plate 130 are illustrated in FIG. 8.

Figure 8:
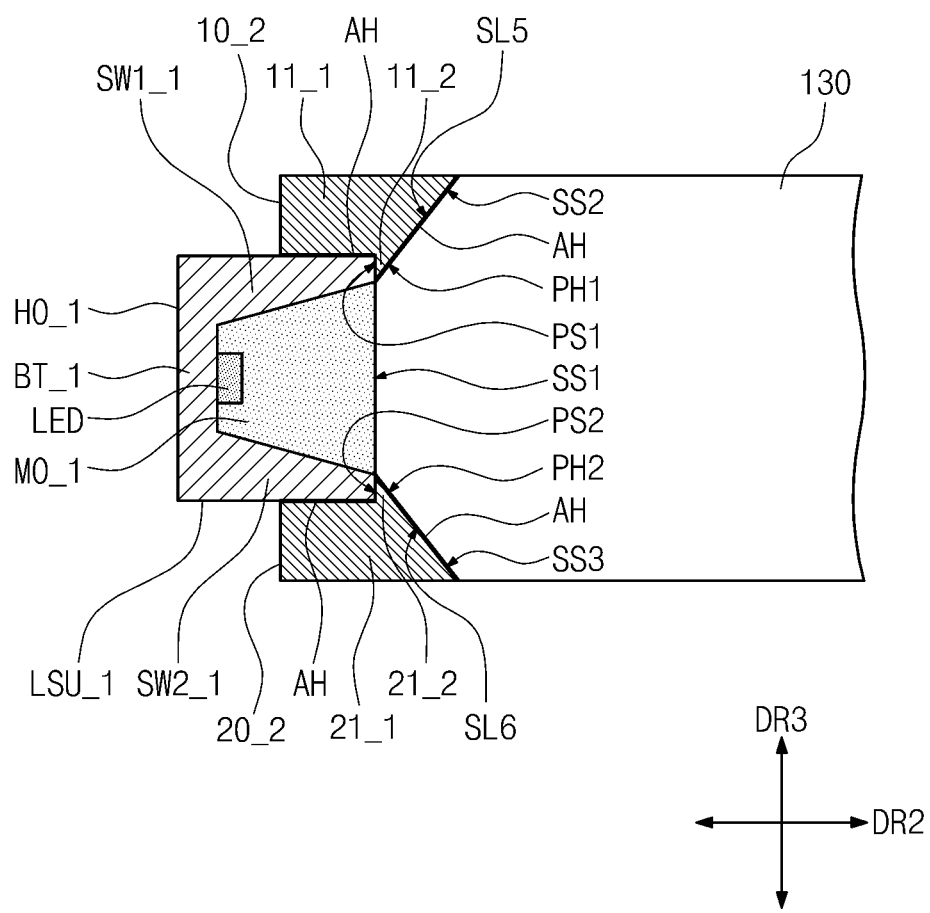

Referring to FIG. 8, a thickness of the light source unit LSU_1 in the third direction DR3 is less than that of the light source unit LSU. A length of the molding part MO_1 of the light source unit LSU_1 in the third direction DR3 may be equal to that of the first side surface SS1 of the light guide plate 130 by the above-described configurations. Other configurations of the light source unit LSU_1 are substantially the same as those of the light source unit LSU of FIG. 6, and thus, descriptions thereof will be omitted.

The first fixing member 10_2 includes a first fixing part 11_1 and a second fixing part 11_2 protruding downward from one side of a bottom surface of the first fixing part 11_1, which is adjacent to the light guide plate 130 in the second direction DR2. Although not shown, the first and second fixing parts 11_1 and 11_2 extend in the first direction DR1, like the first and second fixing parts 11 and 12 of FIG. 4. Each of the first and second fixing parts 11_1 and 11_2 may include a light reflection material.

One side surface of the first fixing part 11_1 may be defined as a fifth inclined surface SL5 extending at a first acute angle θ1 (refer to FIG. 2), like the first inclined surface SL1. The second fixing part 11_2 includes a first protrusion side surface PS1 extending in the third direction DR3 and a first protrusion oblique side PH1 extending from the fifth inclined surface SL5 at the first acute angle θ1 and connected to a lower end of the first protrusion side surface PS1.

The second fixing member 20_2 includes a third fixing part 21_1 and a fourth fixing part 21_2 protruding upward from one side of a top surface of the third fixing part 21_1, which is adjacent to the light guide plate 130 in the second direction DR2. Although not shown, the third and fourth fixing parts 21_1 and 21_2 extend in the first direction DR1, like the third and fourth fixing parts 21 and 22 of FIG. 4. Each of the third and fourth fixing parts 21_1 and 21_2 may include a light reflection material.

One side surface of the third fixing part 21_1 may be defined as a sixth inclined surface SL6 extending at a second acute angle θ2 (refer to FIG. 2), like the third inclined surface SL3. The fourth fixing part 21_2 includes a second protrusion side surface PS2 extending in the third direction DR3 and a second protrusion oblique side PH2 extending from the sixth inclined surface SL6 at the second acute angle θ2 and connected to an upper end of the second protrusion side surface PS2.

The fifth inclined surface SL5 and the first protrusion oblique side PH1 may be disposed on the second side surface SS2 and then connected to the second side surface SS2 using an adhesion member AH. The sixth inclined surface SL6 and the second protrusion oblique side PH2 may be disposed on a lower portion of the third side surface SS3 of the light guide plate 130 and then connected to the third side surface SS3 using the adhesion member AH.

A front surface of the first sidewall part SW1_1 of the light source unit LSU_1 may contact the first protrusion side surface PS1 of the second fixing part 11_2. A front surface of the second sidewall part SW2_1 of the light source unit LSU_1 may contact the second protrusion side surface PS2 of the fourth fixing part 21_2.

The bottom surface of the first fixing part 11_1 may adhere to or be connected to a predetermined area of an upper portion of the light source unit LSU, and the top surface of the third fixing part 21_1 may adhere to or be connected to a predetermined area of a lower portion of the light source unit LSU.

Particularly, the bottom surface of the first fixing part 11_1 may be disposed on a predetermined area of an outer surface of the first sidewall part SW1_1, which is adjacent to the front surface of the first sidewall part SW1_1 and then may adhere to or be connected to the predetermined area of the outer surface of the first sidewall part SW1_1, which is adjacent to the front surface of the first sidewall part SW1_1 using the adhesion member AH.

The top surface of the third fixing part 21_1 may be disposed on a lower portion of a predetermined area of an outer surface of the second sidewall part SW2_1, which is adjacent to the front surface of the second sidewall part SW2_1 and then may adhere to or be connected to the predetermined area of the outer surface of the second sidewall part SW2_1, which is adjacent to the front surface of the second sidewall part SW2_1 using the adhesion member AH. A front surface of the molding part MO_1 may contact the first side surface SS1 of the light guide plate 130.

The light source unit LSU_1 may be firmly fixed to one side of the light guide plate 130 by the first and second fixing members 10_2 and 20_2. Also, the light source unit LSU_1 may contact the first side surface SS1 of the light guide plate 130 to provide a more amount of light to the light guide plate 130. As a result, light incident efficiency may be improved.

Figure 9:
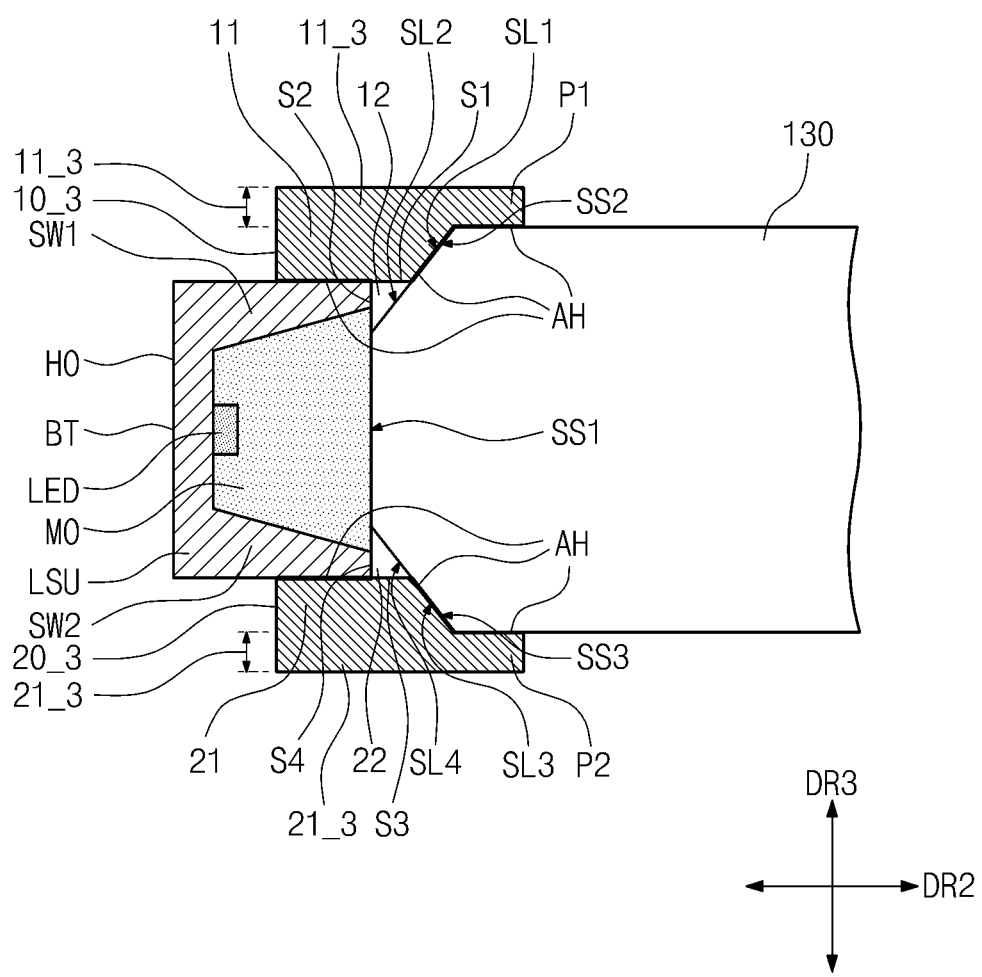

FIG. 9 is a view illustrating components of first and second fixing members of the display apparatus according to another exemplary embodiment of the invention.

The display apparatus according to another exemplary embodiment of the invention may have the same configuration as that of the display apparatus 100 of FIG. 1 except for configurations of first and second fixing members 10_3 and 20_3. Hereinafter, differences between the first and second fixing members 10 and 20 of FIG. 6 and the first and second fixing members 10_3 and 20_3 of FIG. 9 will be mainly described for explaining the first and second fixing members 10_3 and 10_3 of FIG. 9.

The same components will be represented by the same reference numerals. For convenience of description, the connection configurations between the first and second fixing members 10_3 and 20_3, one light source unit LSU, and the light guide plate 130 are illustrated in FIG. 9.

Referring to FIG. 9, the first fixing member 10_3 includes a first sub fixing part 11_3 disposed on the first fixing part 11. In an exemplary embodiment, the first sub fixing part 11_3 may be unitary with the first fixing part 11.

The first sub fixing part 11_3 includes a first portion P1 extending in the second direction DR2 and disposed on a predetermined area of the top surface of the light guide plate 130, which is adjacent to the second sidewall SS2 of the light guide plate 130. The first portion P1 of the first sub fixing part 11_3 may adhere to or be connected to a predetermined area of the top surface of the light guide plate 130, which is adjacent to the second sidewall SS2 of the light guide plate 130 using the adhesion member AH. Other configurations of the first fixing member 10_3 may be substantially the same as those of the first fixing member 10 of FIG. 6, and thus, descriptions thereof will be omitted.

The second fixing member 20_3 includes a second sub fixing part 21_3 disposed on a lower portion of the third fixing part 21. In an exemplary embodiment, the second sub fixing part 21_3 may be unitary with the third fixing part 21.

The second sub fixing part 21_3 includes a second portion P2 extending in the second direction DR2 and disposed on a lower portion of a predetermined area of the bottom surface of the light guide plate 130, which is adjacent to the third sidewall SS3 of the light guide plate 130. The second portion P2 of the second sub fixing part 21_3 may adhere to or be connected to a predetermined area of the bottom surface of the light guide plate 130, which is adjacent to the third sidewall SS3 of the light guide plate 130 using the adhesion member AH. Other configurations of the second fixing member 20_3 may be substantially the same as those of the second fixing member 20 of FIG. 6, and thus, descriptions thereof will be omitted.

The light source unit LSU may be firmly fixed to one side of the light guide plate 130 by the first and second fixing members 10_3 and 20_3. Thus, the light source unit LSU may contact the first side surface SS1 of the light guide plate 130, thereby improving light incident efficiency.

Figure 10:
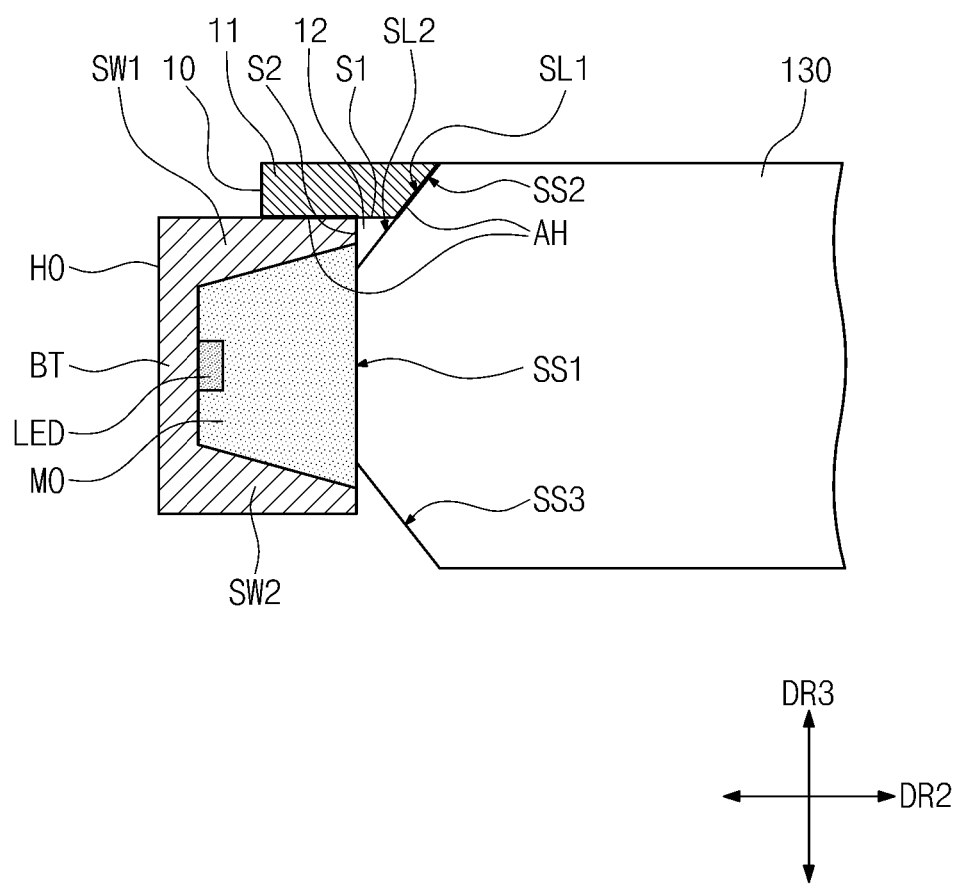
Figure 11:
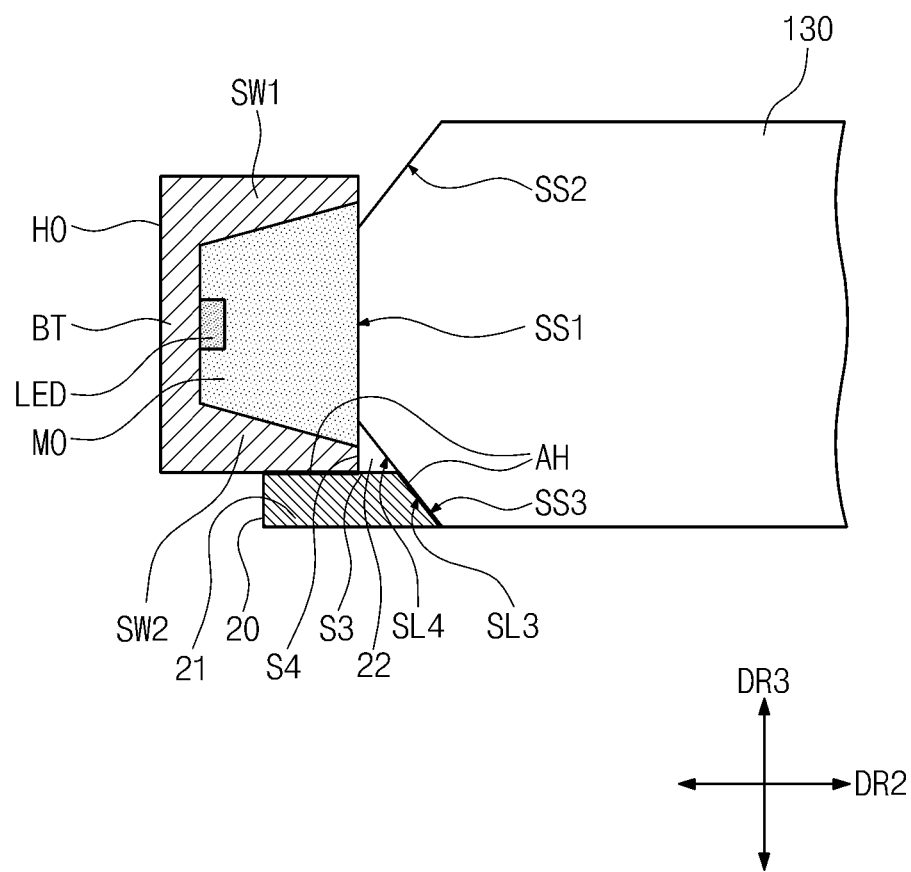

FIGS. 10 and 11 are views illustrating components of first and second fixing members of the display apparatus according to various embodiments of the invention.

The display apparatus according to another exemplary embodiment of the invention may have the same configuration as that of the display apparatus 100 of FIG. 1 except for a structure in which the light source unit LSU is fixed to the light guide plate by one fixing member of the fixing members 10 and 20. The same components will be represented by the same reference numerals.

Referring to FIG. 10, the fixing member 10 fixes a predetermined area of an upper portion of the light source unit LSU to the second side surface SS2 of the side surfaces SS1, SS2, and SS3 of the light guide plate 130. Since the fixing member 10 has the same configuration as that of the first fixing member 10 of FIG. 6, descriptions with respect to configurations of the fixing member 10 and a structure in which the fixing member 10 is connected to the light source unit LSU and the light guide plate 130 will be omitted.

Referring to FIG. 11, the fixing member 20 fixes a predetermined area of a lower portion of the light source unit LSU to the third side surface SS3 of the side surfaces SS1, SS2, and SS3 of the light guide plate 130. Since the fixing member 20 has the same configuration as that of the second fixing member 20 of FIG. 6, descriptions with respect to configurations of the fixing member 20 and a structure in which the fixing member 20 is connected to the light source unit LSU and the light guide plate 130 will be omitted.

In the display apparatus according to the embodiment of the invention, the light source may be firmly fixed to the one side of the light guide plate and may contact the one side surface of the light guide plate to improve the light incident efficiency.

It will be apparent to those skilled in the art that various modifications and variations can be made in the invention. Thus, it is intended that the invention covers the modifications and variations of this invention provided they come within the scope of the appended claims and their equivalents. Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus comprising:
   a display panel which displays an image using light;
   a plurality of light source units arranged in a first direction to generate the light;
   a light guide plate which receives the light and guides the light to the display panel;
   a first fixing member which fixes a predetermined area of an upper portion of each of the plurality of light source units to a first area of one side surface of the light guide plate, which is adjacent to a top surface of the light guide plate in a second direction crossing the first direction; and
   a second fixing member which fixes a predetermined area of a lower portion of each of the plurality of light source units to a second area of the one side surface of the light guide plate, which is adjacent to a bottom surface of the light guide plate in the second direction,
   wherein each of the first and second fixing members includes a light reflection material,
   wherein the first fixing member comprises:
   a first fixing part which extends in the first direction; and
   a second fixing part which extends in the first direction, the second fixing part connected to a predetermined area of a bottom surface of the first fixing part, which is adjacent to one side surface of the first fixing part in the second direction,
   wherein the one side surface of the first fixing part includes a first inclined surface extending at the first acute angle with respect to the second direction in a plane defined by the downward direction of the third direction and a left direction of the second direction,
   the second fixing part has a right-angled triangular shape when viewed in the first direction, a second inclined surface defined as an oblique side of the second fixing part extends at the first acute angle and is disposed on the same plane as the first inclined surface, and a first side of the second fixing part, which is connected to a second side of the second fixing part with a right angle, is disposed on a predetermined area of the bottom surface of the first fixing part, which is adjacent to the first inclined surface,
   the second fixing part is connected to the first fixing part using an adhesive, the first fixing part comprises a light reflection material, and the second fixing part comprises a light transmitting material.

2. The display apparatus of claim 1, wherein the light guide plate comprises a glass.

3. The display apparatus of claim 1, wherein a predetermined area of a front surface of each of the plurality of light source units, which faces the one side surface of the light guide plate, contacts one side surface of the light guide plate between the first area and the second area.

4. The display apparatus of claim 1, wherein the one side surface of the light guide plate comprises:
   a first side surface which is parallel to a third direction perpendicular to a plane parallel to the first and second directions and is parallel to the first direction;
   a second side surface connected to an upper end of the first side surface, the second side surface including an inclined surface extending at a first acute angle with respect to the second direction in a plane defined by an upward direction of the third direction and a right direction of the second direction; and
   a third side surface connected to a lower end of the first side surface, the third side surface including an inclined surface extending at a second acute angle with respect to the second direction in a plane defined by a downward direction of the third direction and the right direction of the second direction,
   wherein the first fixing member is connected to the predetermined area of the upper portion of each of the plurality of light source units and the second side surface, the second fixing member is connected to the predetermined area of the lower portion of each of the plurality of light source units and the third side surface, and the right direction of the second direction is directed from the first side surface to an opposite side surface of the light guide plate, which is a surface opposite to the first side surface.

5. The display apparatus of claim 4, wherein the first acute angle and the second acute angle are the same with each other.

6. The display apparatus of claim 4, wherein the second fixing member comprises:
   a third fixing part which extends in the first direction; and
   a fourth fixing part which extends in the first direction, the fourth fixing part connected to a predetermined area of a top surface of the second fixing part, which is adjacent to one side surface of the second fixing part in the second direction,
   wherein the one side surface of the third fixing part includes a third inclined surface extending at the second acute angle with respect to the second direction in a plane defined in the upward direction of the third direction and the left direction of the second direction, and the fourth fixing part has a right-angled triangular shape when viewed in the first direction, a fourth inclined surface defined as an oblique side of the fourth fixing part extends at the second acute angle and is disposed on the same plane as the third inclined surface, and a third side of the fourth fixing part, which is connected to a fourth side of the fourth fixing part with the right angle, is disposed on a predetermined area of a top surface of the third fixing part, which is adjacent to the third inclined surface.

7. The display apparatus of claim 6, wherein the third fixing parts comprises a light reflection material, and each of the fourth fixing parts comprises a light transmitting material.

8. The display apparatus of claim 6, wherein each of the second and fourth fixing parts has the same refractive index as that of the light guide plate.

9. The display apparatus of claim 6, wherein the first and third inclined surfaces are disposed on the second side surface, and the third and fourth inclined surfaces are disposed on a lower portion of the third side surface.

10. The display apparatus of claim 9, further comprising an adhesion member which connects the first inclined surface to the second side surface and the third inclined surface to the third side surface.

11. The display apparatus of claim 6, wherein a light source unit of the plurality of light source units comprises:
   a bottom part facing the first side surface, the bottom part parallel to the first and third directions;
   a first sidewall part connected to an upper end of the bottom part to extend in the second direction toward the one side surface of the light guide plate;
   a second sidewall part connected to a lower end of the bottom part to extend in the second direction toward the one side surface of the light guide plate, the second sidewall part facing the first sidewall part;
   a light emitting diode disposed on the bottom part to face the first side surface; and
   a molding part disposed on the bottom part to cover the light emitting diode, the molding part disposed between the first and second sidewall parts.

12. The display apparatus of claim 11, wherein a front surface of the first sidewall part toward the one side surface of the light guide plate contacts a predetermined area of the second side of the second fixing part, which is adjacent to the bottom surface of the first fixing part, and
   a front surface of the second sidewall part toward the one side surface of the light guide plate contacts a predetermined area of the fourth side of the fourth fixing part, which is adjacent to the top surface of the third fixing part.

13. The display apparatus of claim 12, wherein the bottom surface of the first fixing part, on which the first side of the second fixing part is not disposed, is disposed on a predetermined area of an outer surface of the first sidewall part, which is adjacent to the front surface of the first sidewall part,
   the top surface of the third fixing part, on which the third side of the fourth fixing part is not disposed, is disposed on a lower portion of a predetermined area of an outer surface of the second sidewall part, which is adjacent to the front surface of the second sidewall part, and
   the outer surface of the first sidewall part is a surface opposite to an inner surface of the first sidewall part on which the molding part is disposed, and the outer surface of the second sidewall part is a surface opposite to an inner surface of the second sidewall part on which the molding part is disposed.

14. The display apparatus of claim 13, further comprising an adhesion member which connects the bottom surface of the first fixing part, on which the first side of the second fixing part is not disposed, to a predetermined area of the outer surface of the first sidewall part, which is adjacent to the front surface of the first sidewall part, and which connects the top surface of the third fixing part, on which the third side of the fourth fixing part is not disposed, to a predetermined area of the outer surface of the second sidewall part, which is adjacent to the front surface of the second sidewall part.

15. The display apparatus of claim 11, wherein a front surface of the molding part toward the one side surface of the light guide plate contacts the first side surface, a predetermined area of the second side of the second fixing part, which is adjacent to the upper end of the first side surface, and a predetermined area of the fourth side of the fourth fixing part, which is adjacent to the lower end of the first side surface.

16. The display apparatus of claim 4, wherein the first fixing member further comprises a first sub fixing part disposed on the first fixing part, and the second fixing member further comprises a second sub fixing part disposed on a lower portion of the third fixing part,
   the first sub fixing part comprises a first portion extending in the second direction and connected to a predetermined area of the top surface of the light guide plate, which is adjacent to the second side surface of the light guide plate, and the second sub fixing part comprises a second portion extending in the second direction and connected to a predetermined area of the bottom surface of the light guide plate, which is adjacent to the third side surface of the light guide plate, and
   the first fixing part and the first sub fixing part are unitary with each other, and the third fixing part and the second sub fixing part are unitary with each other.

17. The display apparatus of claim 4, wherein the first fixing member comprises a plurality of first fixing units respectively corresponds to the plurality of light source units, and the second fixing member comprises a plurality of second fixing units respectively corresponds to the plurality of light source units, and
   each of the plurality of first fixing units fixes a predetermined area of the upper portion of the corresponding light unit of the plurality of light source units to the second side surface of the light guide plate, and each of the plurality of second fixing units fixes a predetermined area of the lower portion of the corresponding light source unit of the plurality of light source units to the third side surface of the light guide plate.

18. The display apparatus of claim 4, wherein the first fixing member comprises:
   a first fixing part which extends in the first direction; and
   a second fixing part which extends in the first direction, the second fixing part protruding downward from one side of a bottom surface of the first fixing part, which is adjacent to the light guide plate in the second direction, and
   the second fixing member comprises:
   a third fixing part which extends in the first direction; and
   a fourth fixing part which extends in the first direction, the fourth fixing part which protrudes upward from one side of a top surface of the third fixing part, which is adjacent to the light guide plate in the second direction, wherein one side surface of the first fixing part includes a fifth inclined surface extending at the first acute angle, and one side surface of the third fixing part includes a sixth inclined surface extending at the second acute angle, the second fixing part comprises:

a first protrusion side surface which extends in the third direction; and a first protrusion oblique side which extends at the first acute angle from the fifth inclined surface, the first protrusion oblique side connected to a lower end of the first protrusion side surface, and the fourth fixing part comprises:

a second protrusion side surface which extends in the third direction; and a second protrusion oblique side which extends at the second acute angle from the sixth inclined surface, the second protrusion oblique side connected to an upper end of the second protrusion side surface, wherein each of the first, second, third, and fourth fixing parts comprises a light reflection material, the fifth inclined surface and the first protrusion oblique side are connected to the second side surface of the light guide plate, the sixth inclined surface and the second protrusion oblique side are connected to the third side surface of the light guide plate, the bottom surface of the first fixing part is connected to the predetermined area of the upper portion of each of the plurality of light source units, and the top surface of the third fixing part is connected to the predetermined area of the lower portion of each of the plurality of light source units.

19. A display apparatus comprising:

a display panel which displays an image using light;

a plurality of light source units arranged in a first direction to generate the light;

a light guide plate which receives the light and guides the light to the display panel; and a fixing member which fixes the plurality of light source units to one side of the light guide plate, wherein the fixing member fixes a predetermined area of an upper portion of each of the plurality of light source units to a first area of one side surface of the light guide plate, which is adjacent to a top surface of the light guide plate in a second direction crossing the first direction or fixes a predetermined area of a lower portion of each of the plurality of light source units to a second area of the one side surface of the light guide plate, which is adjacent to a bottom surface of the light guide plate in the second direction, and wherein the fixing member comprises:

a light reflection material;

a first fixing part which extends in the first direction; and a second fixing part which extends in the first direction, the second fixing part connected to a predetermined area of a bottom surface of the first fixing part, which is adjacent to one side surface of the first fixing part in the second direction, wherein the one side surface of the first fixing part includes a first inclined surface extending at the first acute angle with respect to the second direction in a plane defined by the downward direction of the third direction and a left direction of the second direction, the second fixing part has a right-angled triangular shape when viewed in the first direction, a second inclined surface defined as an oblique side of the second fixing part extends at the first acute angle and is disposed on the same plane as the first inclined surface, and a first side of the second fixing part, which is connected to a second side of the second fixing part with a right angle, is disposed on a predetermined area of the bottom surface of the first fixing part, which is adjacent to the first inclined surface, the second fixing part is connected to the first fixing part using an adhesive, the second fixing part is connected to the first fixing part using an adhesive, the first fixing part comprises a light reflection material, the second fixing part comprises a light transmitting material, and a predetermined area of a front surface of each of the plurality of light source units, which faces the one side surface of the light guide plate, contacts the one side surface of the light guide plate between the first area and the second area.

* * * * *